United States Patent
Navarro et al.

(10) Patent No.: US 11,600,064 B2
(45) Date of Patent: Mar. 7, 2023

(54) SYSTEMS AND METHODS OF AUGMENTING OBJECTS ASSOCIATED WITH PERSONAL DATA

(71) Applicant: The Toronto-Dominion Bank, Toronto (CA)

(72) Inventors: Miguel Navarro, Ewing, NJ (US); Levi Sutter, Westampton, NJ (US); Sadia Zaidi, Robbinsville, NJ (US); Mohamed Abbas, Jersey City, NJ (US)

(73) Assignee: The Toronto-Dominion Bank, Toronto (CA)

( * ) Notice: Subject to any disclaimer, the term of this patent is extended or adjusted under 35 U.S.C. 154(b) by 0 days.

(21) Appl. No.: 17/546,195

(22) Filed: Dec. 9, 2021

(65) Prior Publication Data

US 2022/0101003 A1  Mar. 31, 2022

Related U.S. Application Data

(63) Continuation of application No. 16/408,512, filed on May 10, 2019, now Pat. No. 11,232,304.

(51) Int. Cl.
*G06V 20/20* (2022.01)
*H04L 9/40* (2022.01)
*G06F 21/62* (2013.01)
*G06V 30/413* (2022.01)
*H04L 67/01* (2022.01)

(52) U.S. Cl.
CPC .......... *G06V 20/20* (2022.01); *G06F 21/6245* (2013.01); *G06V 30/413* (2022.01); *H04L 63/0876* (2013.01); *H04L 67/01* (2022.05)

(58) Field of Classification Search
CPC .............................. G06T 19/006; G06V 20/20
See application file for complete search history.

(56) References Cited

U.S. PATENT DOCUMENTS 8,542,906 B1   9/2013   Persson et al.
9,137,232 B2   9/2015   Eschbach et al.
(Continued)

OTHER PUBLICATIONS

USPTO, Office Action relating to U.S. Appl. No. 16/408,512 dated May 13, 2020.
(Continued)

*Primary Examiner* — Shivang I Patel
(74) *Attorney, Agent, or Firm* — Rowand LLP

(57) ABSTRACT

Systems and methods of augmenting objects associated with personal data. A system includes a communication module, a processor, and a memory. The memory stores instructions that, when executed, configure the processor to authenticate a client device based on a credential associated with an account record. The processor receives, from the client device, an indication of a document marker and obtains, from the account record, personal data associated with the document marker. The processor transmits, to the client device, display data based on the personal data. The display data configures the client device to display an augmented reality output based on the personal data and at least one further image of the document. The personal data may include dynamic data varying over time. The display data configuring the client device to display the augmented output may be based on current personal data obtained from the account record.

20 Claims, 9 Drawing Sheets

(56) References Cited

U.S. PATENT DOCUMENTS

| | | | |
|---|---|---|---|
| 9,191,620 B1 | 11/2015 | Katzer et al. | |
| 10,122,888 B2 | 11/2018 | Tsujiguchi | |
| 2009/0138386 A1* | 5/2009 | Wilson, Jr. | G06Q 40/02 |
| | | | 705/14.69 |
| 2014/0079297 A1 | 3/2014 | Tadayon et al. | |
| 2015/0294506 A1 | 10/2015 | Bare et al. | |
| 2016/0049010 A1* | 2/2016 | Hinski | G06V 30/40 |
| | | | 345/633 |
| 2016/0314608 A1 | 10/2016 | Dixon et al. | |
| 2017/0206417 A1 | 7/2017 | Aoyama et al. | |
| 2018/0150810 A1* | 5/2018 | Lee | H04N 5/23293 |
| 2018/0225921 A1 | 8/2018 | Lyons et al. | |

OTHER PUBLICATIONS

USPTO, Office Action relating to U.S. Appl. No. 16/408,512 dated Sep. 9, 2020.

USPTO, Office Action relating to U.S. Appl. No. 16/408,512 dated Jan. 4, 2021.

USPTO, Office Action relating to U.S. Appl. No. 16/408,512 dated Jun. 23, 2021.

* cited by examiner

308

| Registered | Total Value |
|---|---|
| A-series | $16,880 |
| B-series | $25,000 |
| C-series | $9,000 |
| Non-Registered | Total Value |
| A-series | $1,288 |
| G-series | $65,988 |
| Bank Accounts | Total Value |
| Chequing | $7,533 |

SYSTEMS AND METHODS OF AUGMENTING OBJECTS ASSOCIATED WITH PERSONAL DATA

TECHNICAL FIELD

The present application relates to augmented reality systems and, in particular, to systems and methods of augmenting objects associated with personal data.

BACKGROUND

Augmented reality systems can provide users with interactive experiences, where objects, when viewed via a computing device, in a real-world environment may be augmented with computer-generated information. The computer-generated information may be displayed in combination with representations of objects in the real-world environment. In some examples, the computer-generated information may provide additional information related to respective objects in the real-world environment.

For example, a computing device may include an image capture device and a display output device. The display output device may provide a live-view image of an object while the image capture device captures images of the object. An augmented reality application may supplement the live-view image of the object with computer-generated information. The computer-generated information may be constructively combined with the live-view image of the object or may selectively mask portions of the object provided in the live-view image.

BRIEF DESCRIPTION OF THE DRAWINGS

Embodiments are described in detail below, with reference to the following drawings:

FIG. 6 illustrates an example partial view of the document of FIG. 3;

Like reference numerals are used in the drawings to denote like elements and features.

DETAILED DESCRIPTION OF VARIOUS EMBODIMENTS

Figure 1:
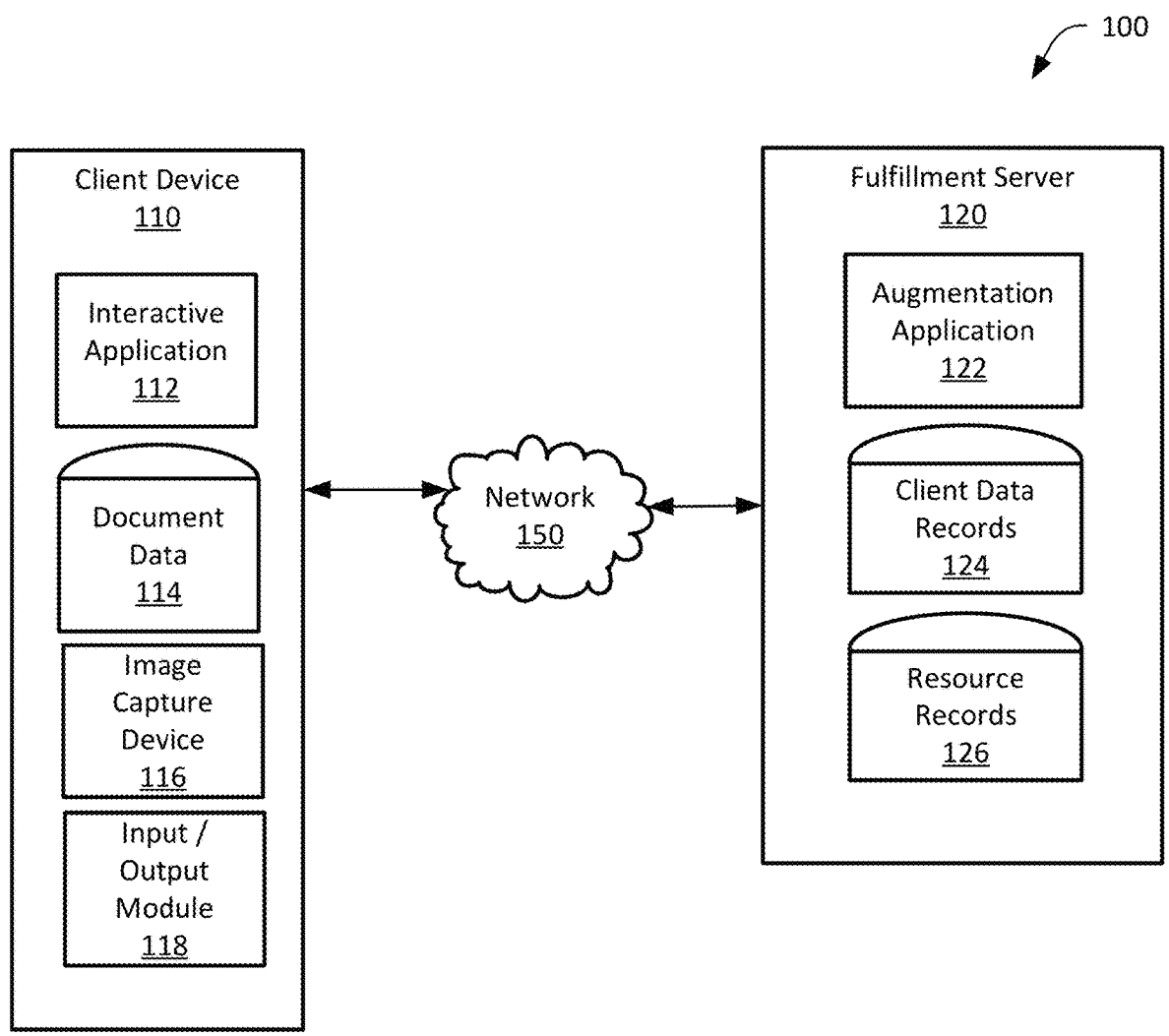
FIG. 1 illustrates, in block diagram form, a system of augmenting objects associated with personal data, in accordance with an example of the present application.

In one aspect, the present application may describe a computing system that includes: a communication module; a processor coupled to the communication module; and a memory coupled to the processor. The memory stores instructions that, when executed, may configure the processor to: authenticate a client device based on a credential associated with an account record; receive, from the client device, an indication of a document marker, wherein the document marker is based on an image of a document; obtain, from the account record, personal data associated with the document marker; and transmit, to the client device, a display data based on the personal data, the display data for configuring the client device to display an augmented reality output based on the personal data and at least one further image of the document.

In some implementations, the personal data may include dynamic data varying over time. The instructions, when executed, may further configure the processor to generate the display data for configuring the client device to display the augmented output based on current personal data obtained from the account record.

In some implementations, the document includes legacy data associated with the account record, and the displayed augmented reality output may include output based on the current personal data overlaying the legacy data to obscure the legacy data.

In some implementations, the personal data may include banking account data having dynamically changing value over time, and the current personal data may include a current market value of an account associated with the banking account data.

In some implementations, the augmented reality output includes a live-view display of the document.

In some implementations, the indication of the document marker may include the image of the document, and the instructions, when executed, may further configure the processor to identify the document marker using image recognition.

In some implementations, the augmented reality output may include at least one of graphs or charts associated with the personal data.

In some implementations, the document marker may include at least one of a keyword, a barcode, or a graphical symbol.

In some implementations, the instructions, when executed, may further configure the processor to: receive, from the client device, a user selected subset of the augmented reality output; and transmit further display data for displaying the selected subset of the augmented reality output at the client device.

In another aspect, the present application may describe a computer-implemented method of augmenting objects associated with personal data. The method may include: authenticating a client device based on a credential associated with an account record; receiving, from the client device, an indication of a document marker, where the document marker may be based on an image of a document; obtaining, from the account record, personal data associated with the document marker; and transmitting, to the client device, display data based on the personal data, the display data for configuring the client device to display an augmented reality output based on the personal data and at least one further image of the document.

In some implementations, the personal data may include dynamic data varying over time, where the method may further comprise generating the display data for configuring client device to display the augmented output based on current personal data obtained from the account record.

In some implementations, the document may include legacy data associated with the account record, and wherein the displayed augmented reality output includes output based on the current personal data overlaying the legacy data to obscure the legacy data.

In some implementations, obtaining the personal data associated with the document marker may be subsequent to authenticating the client device based on the credential.

In some implementations, the augmented reality output may include a live-view display of the document.

In some implementations, the indication of the document marker may include the image of the document, and the method may further comprise identifying the document marker using image recognition.

In some implementations, the augmented reality output may include at least one of graphs or charts associated with the personal data.

In some implementations, the document marker may include at least one of a keyword, a barcode, or a graphical symbol.

In some implementations, the method may further include: receiving, from the client device, a user selected subset of the augmented reality output; and transmitting further display data for displaying the selected subset of the augmented reality output at the client device.

In another aspect, a non-transitory computer-readable storage medium is provided to store processor executable instructions that, when executed, cause a processor of a computing device to carry out the operations of one or more methods described herein. The computer-readable storage medium may include instructions for augmenting objects associated with personal data. For example, the processor executable instructions may configure the processor of the computing device to cause the computing device to authenticate a client device based on a credential associated with an account record; receive, from the client device, an indication of a document marker, where the document marker is based on an image of a document; obtain, from the account record, personal data associated with the document marker; and transmit, to the client device, display data based on the personal data, where the display data may configure the client device to display an augmented reality output based on the personal data and at least one further image of the document.

Other aspects and features of the present application will be understood by those of ordinary skill in the art from a review of the following description of examples in conjunction with the accompanying figures.

In the present application, the term "and/or" is intended to cover all possible combinations and sub-combinations of the listed elements, including any one of the listed elements alone, any sub-combination, or all of the elements, and without necessarily excluding additional elements.

In the present application, the phrase "at least one of . . . or . . . " is intended to cover any one or more of the listed elements, including any one of the listed elements alone, any sub-combination, or all of the elements, without necessarily excluding any additional elements, and without necessarily requiring all of the elements.

While examples described herein include data or fulfillment servers associated with banking institutions, the systems and methods described herein may also be applicable to servers associated with non-banking institutions that store and process personal data. For example, non-banking data servers may include government operated computer servers for administering taxation programs, retail company servers for administering customer loyalty/incentive programs, among other examples. Personal data may be data that, if misappropriated, may be perilous to a user's identity or may be considered a privacy breach.

Augmented reality systems may provide users with an interactive experience. Objects in a real-world environment may be augmented with computer-generated information. The computer-generated information may be provided by an output module (e.g., display screen, loudspeaker, or the like) in combination with a representation of the objects in the real-world environment. In some examples, the augmentation may be visual, auditory, haptic, or olfactory in nature. In some examples, the computer-generated information may be constructive. That is, a real-world object may be supplemented with the computer-generated information. In some examples, the computer-generated information may be destructive. That is, the computer-generated information may selectively mask or be overlaid on a representation of an object in the real-world environment. Example augmented reality systems augment a user's experience by integrating representations of objects in the real-world environment with computer-generated information.

In some examples, an augmented reality system may augment a document associated with resources, such as services, monetary value, goods, digital assets, or the like, corresponding to a user. To illustrate, a document may be a bank statement for a user and the bank statement may provide a summary of resources and associated market value of the resources. It may be appreciated that while examples described herein relate to bank related documents for respective targeted users, example documents may be other types of non-bank related documents associated with personal data of a user. In some examples, the augmented reality system may augment objects that may be associated with personal data. In some examples, personal data can include names, addresses, taxpayer identification numbers, bank account summaries, personal investment portfolio information, or the like. The personal data may include data that, if misappropriated by an unscrupulous entity, may be used for conducting fraudulent activity or that may be injurious to a user.

In some examples, a fulfillment server may generate a hard-copy document for a user. The fulfillment server may be associated with a banking institution and the banking institution may provide one or more bank accounts for tracking monetary value of a user. The hard-copy documents may be periodically generated and sent to a user and may provide a summary of the one or more bank accounts for that user at a particular point in time (e.g., end of month, end of quarter, etc.). Because generated documents may provide a summary at a particular point in time, in some scenarios, a generated document containing information associated with a time-varying value may become obsolete when received by an intended user. That is, the intended user may receive the generated document including data regarding market value of assets one or more days after the document was generated. In some further examples, unintended users or entities may handle hard-copy documents associated with personal data. It may be desirable to provide systems and methods for presenting personal data to authenticated users and, in addition, to provide systems and methods for presenting substantially real-time updates associated with personal data to the authenticated users.

Reference is made to FIG. 1, which illustrates in block diagram form, a system 100 of augmenting objects associated with personal data, in accordance with an example of the present application. As described, in some examples, personal data may include data associated with banking accounts or resource records. In some other examples, it may be understood that personal data may include other types of data in non-banking contexts, the misappropriation of which by an unscrupulous entity may be injurious to a user associated with that personal data.

The system 100 includes a client device 110 and a fulfillment server 120. Although FIG. 1 illustrates a single client device 110 and a single fulfillment server 120, in some examples, any number of client devices or fulfillment servers may be included. The fulfillment server 120 may be a data server associated with a banking institution. Further, the client device 110 may be associated with a user. In some examples, a given client device 110 may be utilized by two or more users, where each respective user may provide authentication credentials (e.g., login name, passcode, or the like) when utilizing the client device 110 or when interfacing with an application of the client device 110.

The system 100 may include a network 150. The client device 110 and the fulfillment server 120 may be configured to communicate over the network 150 with one another or with any other similar computing device. The network 150 may include one or a combination of interconnected wired or wireless networks, including the Internet, local area networks, wireless area networks, or the like.

As described, the client device 110 may be associated with a user. The client device 110 may be configured to receive input and may be configured to interact with the user. For example, the client device 110 may include an interactive application 112 having processor executable instructions stored in memory that, when executed, cause a processor to conduct operations described herein for receiving user input via an input module or providing augmented reality output on an output module. In illustrative examples, the interactive application 112 may be a mobile banking application associated with the fulfillment server 120 (e.g., banking institution server). As will be described herein, the interactive application 112 may receive input, such as an image of a document or object, and may conduct actions or generate an augmented reality output based on received signals or display data from the fulfillment server 120. Other types of applications may be contemplated.

The client device 110 may also include document data 114 stored in memory that may be associated with input received from a user. For example, the document data 114 may include data associated with document images captured by an image capture device 116. The document data 114 may be transmitted to the fulfillment server 120 or the document data 114 may include indications of document markers described herein. The indications of the document markers may be associated with providing augmented reality output.

The image capture device 116 may be configured to capture images of objects or documents. The client device 110 may include an input/output module 118 and the user may interact with the client device 110 via the input/output module 118. In some examples, the input/output module 118 may include a touch screen display for displaying a user interface and a touch screen interface for receiving motion or touch input from the user. In some examples, the input/output module 118 may include a physical keyboard, a pointing device, or other examples of input devices for receiving user input. A user may interact with the client device 110 via the input/output module 118.

The fulfillment server 120 may be a single server, multiple servers, a server farm, or any other such arrangement of computing devices to implement computing server-like functionality. The fulfillment server 120 includes one or more processors, memory, and a communication module for providing communications capabilities with other computing devices. In the example where the fulfillment server 120 may be associated with a banking institution, the fulfillment server 120 may manage accounts associated with at least one user.

The fulfillment server 120 may include an augmentation application 122 for augmenting objects associated with personal data. The augmentation application 122 may include processor executable instructions stored in memory that, when executed, cause a processor to conduct operations described herein. For example, the augmentation application 122 may cause a processor to authenticate a client device 110 based on a credential associated with a client data record and receive, from the client device 110, an indication of a document marker. The document marker may be based on an image of a document. The processor may obtain, from the client data record, personal data associated with the document marker and transmit, to the client device 110, display data based on the personal data. The display data may configure the client device 110 to display an augmented reality output based on the personal data and at least one further image of the document.

The fulfillment server 120 may include client data records 124. The client data records 124 may include a data structure having information associated with one or more users. The users may be associated with and/or authenticated at a client device 110. Example client data records 124 include a running balance of monetary value associated with bank accounts (e.g., savings account, chequing account, etc.), investment accounts, lending accounts (e.g., mortgage accounts, line-of-credit account, etc.), or the like. Respective client data records 124 or bank account information may be associated with a user identifier or a credential associated with respective users.

The fulfillment server 120 may include resource records 126. The resource records 126 may track resources, including currency, monetary value, digital assets, tokens, precious metals, among other examples. In some examples, a client data record 124 may be associated with a resource record 126. The association between the client data record 124 and the resource record 126 may be used to track a real-time or substantially real-time value of accounts or investment instruments.

As described, personal data includes data that may be considered confidential. As hard-copy documents may unintentionally be exposed while being transported (e.g., via postal mail), it may be desirable to limit the quantity of personal data included in hard-copy documents and to augment documents with supplemental personal data upon authenticating a user associated with the document. Further, personal data may include dynamic data that may vary over time. For instance, market value of a mutual fund or a chequing account balance may vary over the course of a day, week, month, or other time period. It may be desirable to augment documents with real-time or substantially real-time data for providing a user with current information.

Figure 2:
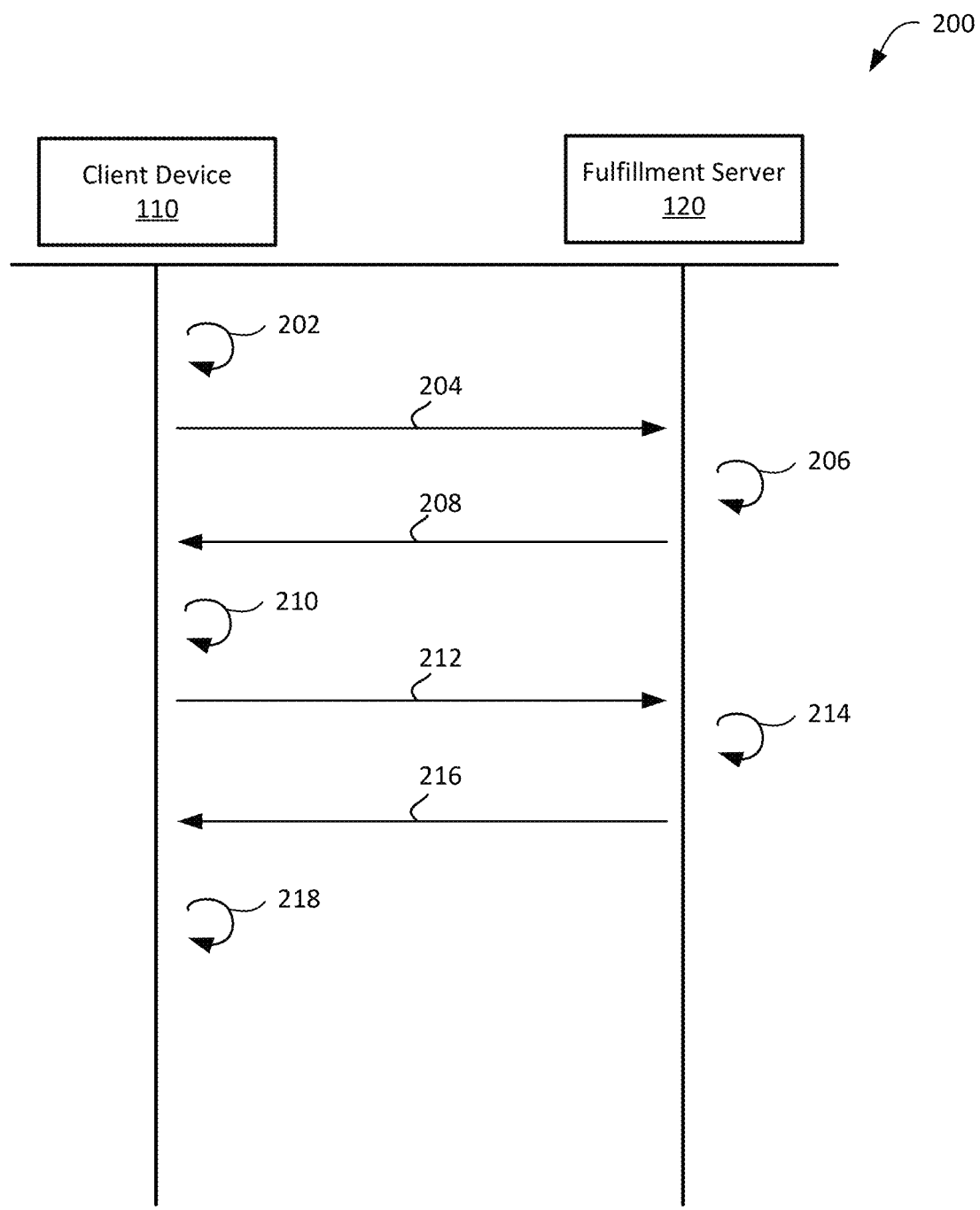
FIG. 2 illustrates a signal diagram illustrating exchanges among computing devices for augmenting objects associated with personal data, in accordance with an example of the present application.

Reference is made to FIG. 2, which illustrates a signal diagram 200 illustrating exchanges among computing devices for augmenting objects associated with personal data, in accordance with an example of the present application. The signal diagram 200 includes the example client device 110 and the fulfillment server 120 of FIG. 1.

The signal diagram 200 illustrates operations that may be implemented, at least in part, through processor executable instructions stored at one or more of the computing devices. The operations may be carried out by one or more processors of the respective devices, servers, or applications thereon. Further, the signal diagram 200 illustrates operations or exchanges associated with particular computing servers or devices. Although a particular operation may be illustrated as being conducted at a particular device, it may be contemplated that the particular operation may be conducted alternatively at another device. For example, in a scenario where a user enters an authentication passcode, operations for validating the user identity may be conducted at the client device 110, at the fulfillment server 120, or at a combination of the client device 110 and the fulfillment server 120.

To illustrate example operations of the present application, the client device 110 may be associated with a user and the interactive application 112 (FIG. 1) may be a mobile banking application associated with the fulfillment server 120 (e.g., banking institution server). The interactive application 112 may include instructions that, when executed, cause the processor to execute operations described herein for providing an augmented reality output based on personal data.

At operation 202, the client device 110 may display a request to the user for an authentication credential. The authentication credential may include a client card number, account number, username, or passcode, among other examples. The authentication credential may authenticate the user for an action while the user operates the client device 110. In some examples, the client device 110 may include authentication records for authenticating the user at the client device 110.

In some other examples, the fulfillment server 120 may conduct the authentication. At operation 204, the client device 110 may transmit the received authentication credential to the fulfillment server 120 and, at operation 206, the fulfillment server 120 may determine whether the received authentication credential matches a credential associated with a client data record 124 (FIG. 1). That is, the fulfillment server 120 may authenticate the client device based on a credential associated with an client data record 124.

At operation 208, the fulfillment server 120 may transmit an authentication result indication the client device 110.

In some examples, once the user is authenticated, the interactive application 112 of the client device 110 may maintain an authenticated session with the augmentation application 122 of the fulfillment server 120 until such time that a session ending command is provided or the session is otherwise terminated. In some other examples, the client device 110 may be configured to associate an authentication credential with indications of document markers or with other requests/queries, such that the fulfillment server 120 conducts authentication operations when respective transmissions between the client device 110 and the fulfillment server 120 are made.

At operation 210, the client device 110 may capture, via the image capture device 116 (FIG. 1), an image of a document. To illustrate, the document may be a paper-based investment product statement associated with a brokerage account. The document may summarize performance of investment products up to a fixed point in time (e.g., end of a fiscal or calendar quarter). In some examples, the document may include general personal information associated with the user, such as a name, address, and a summary listing of investment products or value. In some examples, the document may lack detailed information deemed confidential or sensitive to the user. For instance, the document may lack details outlining the investment portfolio mix (e.g., percentage holdings), the adjusted cost base value (e.g., for determining changes in portfolio value since opening an account), or other information that may be deemed personal and confidential.

At operation 212, the client device 110 may transmit an indication of a document marker to the fulfillment server 120. In some examples, the client device 110 may parse the document image to identify one or more document markers. The document marker may be based on an image of the document. For example, the document marker may be a keyword, a barcode, or a graphical symbol printed on the document. As will be described, in further operations, the fulfillment server 120 may obtain personal data or generate augmented data for the authenticated user based on the document marker. In some examples, the identified document marker may be transmitted to the fulfillment server 120. In some other examples, the client device 110 may include instructions to cause a processor to decipher what action or query may be associated with the document marker and, subsequently, transmit that indication of the document marker to the fulfillment server 120.

In some examples, an indicator of the document marker may be the image of the document itself and the client device 110, at operation 212, may transmit the image of the document to the fulfillment server 120. In the present example, the fulfillment server 120 may parse the document image for identifying one or more document markers based on image recognition operations.

At operation 214, the fulfillment server 120 receives the indication of the document marker and obtains, from one or more client data records 124, personal data associated with the document marker. In some examples, the fulfillment server 120 may obtain the personal data associated with the document marker subsequent to authenticating the client device 110 based on the credential.

Continuing with the above-described example, the fulfillment server 120 may retrieve a client data record associated with the user of the authenticated client device and may obtain personal data associated with the document marker. For instance, the document marker may be a keyword phrase "registered accounts". In some scenarios, the document may include a summary listing of investment products associated with the user's "registered accounts"; however, it may be desirable to provide a detailed view of the investment products. Accordingly, the fulfillment server 120 may be configured to generate the personal data based on data entries stored in the client data record. In some examples, the fulfillment server 120 may generate graphical illustrations of the portfolio allocation of investment products associated with the user. Based on the obtained personal data, the fulfillment server 120 may generate display data for configuring the client device 110 to display an augmented reality output based on the personal data.

At operation 216, the fulfillment server 120 transmits, to the client device 110, the display data based on the personal data for configuring the client device 110 to display an augmented reality output supplementing the image of the document.

At operation 218, the client device 110 generates an augmented reality output for display via the input/output module 118. For example, while the user positions the client device 110 adjacent to the document such that the image capture device 116 captures an image of the document, the display data received from the fulfillment server 120 may configure the client device 110 to overlay augmented reality content overtop the image of the document. Accordingly, using a display screen or other output module, the user may view a combination of the document and the augmented reality content based on the personal data.

In some examples, while the user positions the client device 110 adjacent the document, the client device 110 may provide a live-view display of the document. Once the client device 110 conducts the example operations described in the signal diagram of FIG. 2 and receives the display data associated with augmented reality output, the client device 110 may display the supplemental content as augmented reality content within the live-view display of the document.

In some examples, a user-specific document may be a hard-copy document that was prepared for a particular user. That is, the document may include a user-specific document marker, such as a barcode, a name, an account number, or other unique identifier, that is associated with personally identifying information of the specific user. As will be described, the client device 110 may be configured to display, via a live-view display, augmented reality output in combination with a visual representation of the user-specific document when: (1) the client device 110 authenticates the specific user via the interactive application 112; and (2) the client device 110 identifies that the user-specific document marker is associated with the specific user who has been authenticated at the client device 110. In the present example, the client device 110 may provide augmented reality output in combination with a user-specific document on the live-view display when the specific user is authenticated (e.g., logged in) at the client device 110. Conversely, the client device 110 may not provide the augmented reality output in combination with the above-described user-specific document when an alternate user is authenticated (e.g., logged in) at the client device 110. In the latter scenario, although the alternate user may be authenticated at the client device 110, the user-specific marker of the above-described user-specific document may not be associated with the alternate user and thereby prevents display of the user-specific augmented reality output, or any augmented reality output, to the alternate user.

In some examples, the document may be non-user specific. That is, the document may be a generic document for triggering augmented reality output to be displayed at the client device 110. For instance, the document may be a chequing account statement template that may include section headers. The chequing account statement template may be a standard form for printing user specific information thereon. To address some of the challenges relating to keeping hard-copy documents unexposed to unscrupulous parties, example systems and methods described herein may provide user-specific augmented reality output based, in part, on a document template defining data types to be provided as augmented reality output.

In one example, the client device 110 may be configured to display user-specific augmented reality output in combination with a visual representation of the chequing account statement template. The respective section headers may be document markers. The client device 110 or the fulfillment server 120 may determine the data type(s) and user-specific data that may be included in the augmented reality output. For example, the chequing account statement template may include the headings: overall balance, total credits, total debits, overdraft limit, or the like, and the headings may identify data type(s) to be included in the augmented reality output. The data type(s) may be applicable to users who may have an associated chequing account statement. Accordingly, when a first user is authenticated at the client device 110, the client device 110 may provide augmented reality output that includes a first set of data associated with the first user for each of the overall balance, total credits, total debits, overdraft limit, or the like. Similarly, when a second user is authenticated at the client device 110, the client device 110 may provide augmented reality output that includes a second set of data associated with the second user for each of the overall balance, total credits, total debits, overdraft limit, or the like. Thus, the example chequing account statement template may be used by any one of multiple users for triggering augmented reality output that may be specific to the authenticated user at the client device 110.

In the examples described herein, the generated augmented reality output may be displayed in response to a successful user authentication. The augmented reality output may include supplemental content based on personal data of a particular user that may be confidential. Thus, the systems and methods described herein may provide access controls associated with displaying or otherwise providing supplemental content to a successfully authenticated user. That is, the fulfillment server 120 may provide personal information using augmented reality output on a user-by-user basis.

Figure 3:
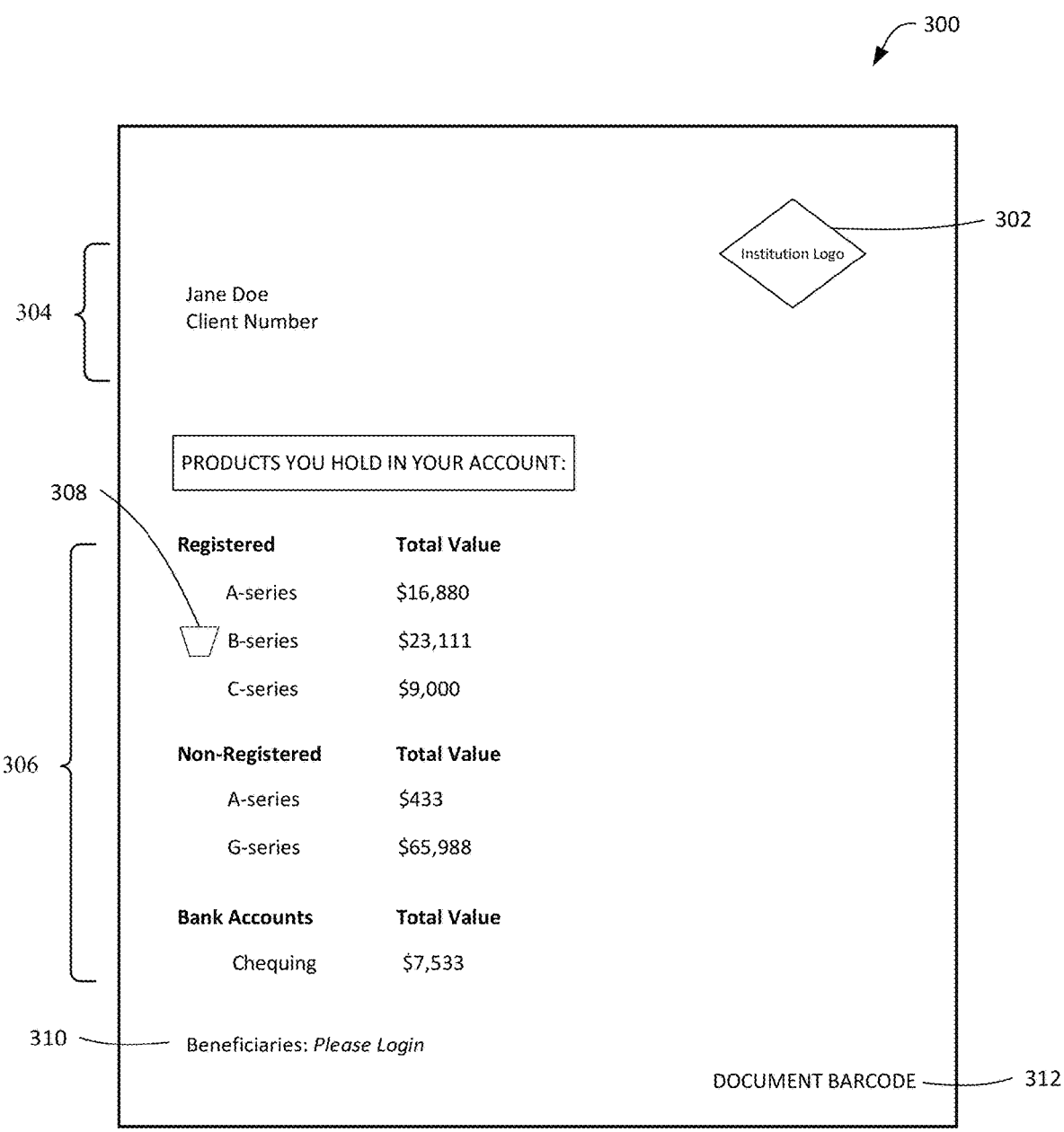
FIG. 3 illustrates a document on which augmented reality objects based on personal data may be provided, in accordance with an example of the present application.

Reference is made to FIG. 3, which illustrates a document 300 on which augmented reality objects based on personal data may be provided, in accordance with an example of the present application.

Continuing with above described examples, the fulfillment server 120 (FIG. 1) may be associated with a banking institution and the client device 110 may be associated with a user. The document 300 may be a periodic statement providing a listing of products associated with a user.

The document 300 may include an institution logo 302 that identifies a branch of the banking institution. For example, the institution logo 302 may be a logo for the wealth management division of the banking institution. The institution logo 302 may be an example of a document marker. In the present example, the institution logo 302 may be included on a template investment statement. Accordingly, when the fulfillment server 120 identifies the institution logo 302 as a document marker, the fulfillment server 120 may identify a set of data types associated with the template investment statement. In the present example, when the fulfillment server 120 generates display data to display an augmented reality output, the augmented reality output may include user data associated with each of the respective data types associated with the template investment statement.

The document 300 may include a general user identifier 304 associated with the user. Further, the general user identifier 304 may be another example document marker. The general user identifier 304 may include high-level information that may be used to uniquely identify the user and may not include specific details, such as an address, birthdate, taxpayer identification number, or the like. In the illustrated example, the user is "Jane Doe" and a client number may be provided. In some scenarios, the client number may be an assigned number that may not have any significance to an organization other than the banking institution associated with the institution logo 302.

In the example where the document 300 is a user-specific document (e.g., aforementioned example user-specific document), the fulfillment server 120 may generate display data to display an augmented reality output in combination with the user-specific document only in response to determining that the general user identifier 304 is associated with the authenticated user of the client device 110. That is, in the scenario where the general user identifier 304 (e.g., Jane Doe) is not associated with the authenticated user (e.g., Bob) of the client device 110, the fulfillment server 120 may not generate the display data to display any augmented reality output in combination with the user-specific document.

The document 300 may also include a summary list 306 of products that may be associated with the user. The summary list 306 may provide a listing of product names and an aggregate total value associated with the respective products for the user. In some examples, a product name may be supplemented with a product logo 308. The product logo 308 may be another example document marker. In some examples, when the fulfillment server 120 identifies the product logo 308 as a document marker, the fulfillment server 120 may identify a set of data types associated with the product logo 308. As will be described in a subsequent illustrated example, the set of data types may include data relating to cash holdings, securities holdings, equity holdings, or the like. Thus, the fulfillment server 120 may be configured to retrieve data relating to cash holdings, security holdings, equity holdings, or the like, that is associated with the user (e.g., the user who has authenticated with the fulfillment server 120 and/or the client device 110).

The document 300 may further include a section for identifying Beneficiaries 310 of the user. In some scenarios, beneficiary identification may be confidential information that users may not wish to be published. In the example illustrated in FIG. 3, the term "Beneficiaries" may be another example document marker. That is, when the fulfillment server 120 identifies the term "Beneficiaries" as a document marker, the fulfillment server 120 may be configured to retrieve data relating to a beneficiary name that is associated with the user (e.g., the user who has authenticated with the fulfillment server 120 and/or the client device 110).

The document 300 may include a document barcode 312, which may be another example document marker. The document barcode 312 may encode data for identifying the document type, document version, or other attributes associated with the document 300. For instance, the document barcode 312 may be a 1-dimensional barcode, a 2-dimensional barcode, or other type of barcode. In an example where the document 300 illustrated in FIG. 3 is a user-specific document, the document barcode 312 may correspond to user identification data (e.g., Jane Doe).

Further, the fulfillment server 120 may be configured to retrieve data associated with the one or more of the illustrated document markers in response to determining Jane Doe is the authenticated user (e.g., Jane Doe has authenticated with the fulfillment server 120 and/or the client device 110). Thus, augmented reality output is combined with a visual representation of the document 300 when: (1) Jane Doe authenticates with the fulfillment server 120 and/or the client device; and (2) the fulfillment server validates that the user (e.g., Jane Doe) associated with the document barcode 312 corresponds to the user authenticated with the fulfillment server 120 and/or the client device 110).

In another example, an alphanumeric text string may be an example document marker. For example, the document 300 of FIG. 3 includes the text string "$23,111". In the present example, the fulfillment server 120 may be configured to query a client data record 124 associated with the user (e.g., the user who has authenticated with the fulfillment server 120 and/or the client device 110) to identify further supplemental data associated with the text string "$23,111". As an illustration, the fulfillment server 120 may identify the data type associated with the text string "$23,111" and, subsequently, determine that updated user data associated with that identified data type may be available. Thus, the fulfillment server 120 may generate display data to provide an augmented reality output to overlay the updated user data atop the text string "$23,111" in a visual representation of the document 300. In the present example, the document 300 may have data printed thereon that is outdated. Accordingly, the text string $23,111 may be an example document marker for triggering augmented reality output for providing updated user data.

The fulfillment server 120 may be configured to retrieve data corresponding to the authenticated user and associated with one or a combination of any number of document markers and, subsequently, generate display data for displaying an augmented reality output associated with the retrieved data. The institution logo 302, the general user identifier 304, the summary list 306, the product logo 308, or the document barcode 312 are illustrative examples of document markers and other examples may be contemplated. For instance, document markers may include the document date, document numbers, or other identifying feature of the document 300. In one example, the fulfillment server 120 may utilize a document date for identifying a particular version of the document 300.

Figure 4:
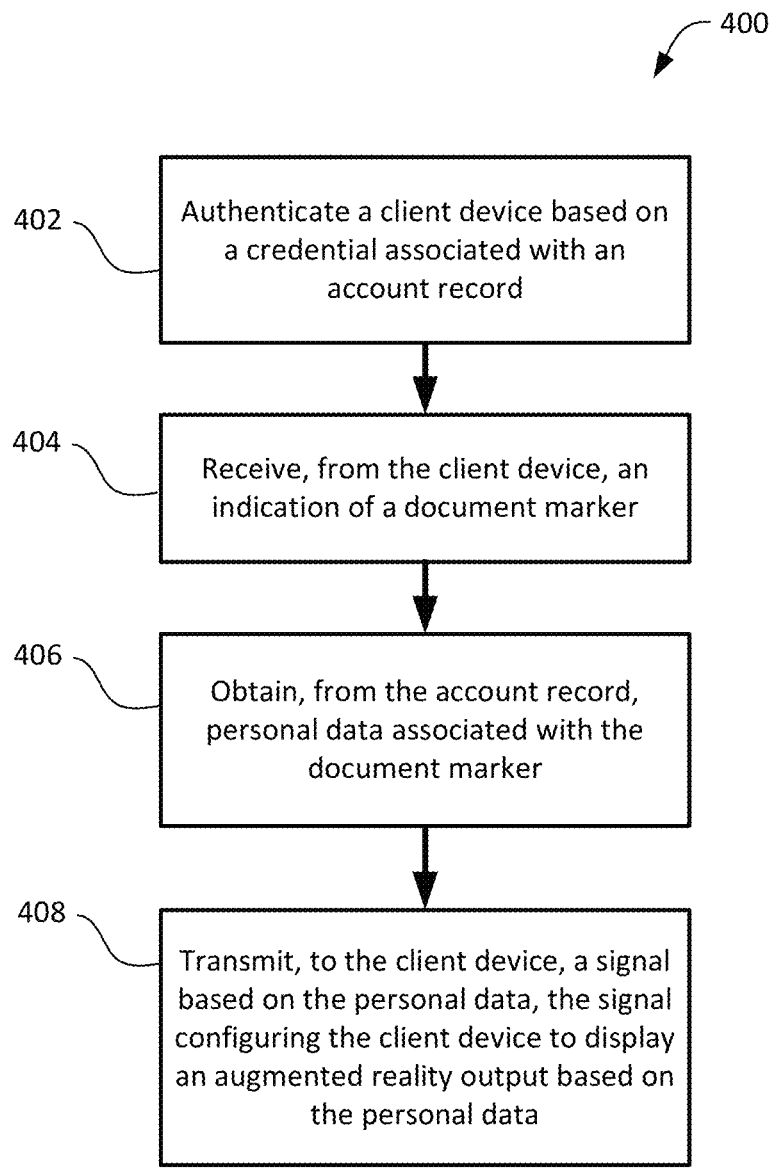
FIG. 4 illustrates, in flowchart form, a method of augmenting objects associated with personal data, in accordance with an example of the present application.

Reference is made to FIG. 4, which illustrates, in flowchart form, a method 400 of augmenting objects associated with personal data, in accordance with an example of the present application. The method 400 includes operations that may be carried out by one or more processors of the fulfillment server 120 (FIG. 1). For example, the method 400 may be implemented, at least in part, through processor executable instructions associated with the augmentation application 122 (FIG. 1). In some examples, one or more operations may be implemented via processor executable instructions in other applications or in an operating system stored and executed on the fulfillment server 120.

Continuing with the example described above, the fulfillment server 120 may be associated with a banking institution providing products to the user. The user may interact with the client device 110. The client device 110 may receive authentication credentials from the user prior to providing augmented reality output. Further, the document 300 illustrated in FIG. 3 may be a hard-copy document sent via postal mail or generated at a brick-and-mortar bank location. At least some of the operations of the augmentation application 122 may provide an augmented reality output based on personal data for supplementing the information printed on the document 300.

At operation 402, the processor authenticates the client device 110 based on a credential associated with an account record (e.g., a client data record 124 of FIG. 1). In some examples, the client device 110 may be associated with the user and the client device 110 may receive from the user a set of login credentials including a client identification number and a passcode for activating the interactive application 112 (FIG. 1). The interactive application 112 may be a mobile banking application. The processor of the fulfillment server 120 may receive, from the client device 110, the login credentials and authenticate the client device 110. The login credentials may be associated with one or more of the client data records. Thus, the processor of the fulfillment server 120 may retrieve a data record associated with the user. Other operations for authenticating the client device 110 including operations at one or a combination of the client device 110 and the fulfillment server 120 may be contemplated.

At operation 404, the processor receives, from the client device 110, an indication of a document marker. The document marker may be based on an image of the document 300. The document marker may include a product logo 308 (FIG. 3), a keyword (e.g., the word "Beneficiaries", "A-series", etc.), a document barcode 312, or other features of the document 300. In some examples, the client device 110 may be positioned to capture an image of the entire document 300. The image may include a view of several document markers. In some other examples, the user may position the client device 110 adjacent the document 300 such that a subset portion of the document 300 may be imaged by the image capture device 116 (FIG. 1) of the client device 110. Depending on how the document 300 may be positioned within a field of view of the image capture device 116, the processor may capture an image including fewer or greater number of document markers.

In some examples, the indication of the document marker may be the image of the complete document. That is, the client device 110 may capture an image of the document 300 and, subsequently, transmit that image of the document 300 to the fulfillment server 120. In the present example, the processor (of the fulfillment server 120) may identify one or more document markers using image recognition operations. For example, image recognition operations may include optical character recognition operations or image parsing operations for identifying graphical icons/logos or document barcodes.

In some other examples, the client device 110 may conduct the image recognition operations to identify one or more keywords, graphical symbols, or barcodes and, subsequently, may transmit a summary of the identified document markers to the fulfillment server 120. In the present example, the summary of the identified document markers may be sufficient for identifying associated personal data.

At operation 406, the processor obtains, from the account record associated with the authenticated user, personal data associated with the document marker. For example, referring again to FIG. 3, the document includes the institution logo 302. The institution logo 302 may be an example of a document marker. The processor may identify the institution logo 302 as a document marker and, in response, may identify that the document may be a standard bank statement having a set of data types. For instance, the data types may include data for aggregate total value of banking products, data indicating beneficiary designation, data for providing granular details associated with the various banking products, or the like. Accordingly, the processor may be configured to retrieve, from the data record associated with the authenticated user, personal data of the aforementioned example data types for the authenticated user.

In another example, the document 300 of FIG. 3 includes the product logo 308 and the summary list 306 of banking products. The processor may identify the product logo 308 and/or text-strings of the summary list 306 (e.g., A-series, B-series, C-series, G-series, etc.) as document markers and, in response, may be configured to retrieve data for providing granular data or for generating visual summaries (e.g., pie charts, graphs, or the like) associated with the respective banking products.

In another illustrating example, the processor may identify the text string Beneficiaries 310 as a document marker and obtain, from the data record associated with the authenticated user, beneficiary names. The beneficiary names may be an example of personal data which the authenticated user may desire to remain confidential.

In another illustrating example, the processor may identify the document barcode 312 as a document marker. For instance, the document barcode 312 may be a barcode encoded with information associated with a user. In an example where the document 300 may be a user-specific document, the encoded information may be used by the fulfillment server 120 to determine whether display data representing an augmented reality output shall be generated. For example, the processor may decode the document barcode 312 and may determine that the document 300 is a user-specific document for "Jane Doe". Thus, the processor may obtain, from the data record associated with "Jane Doe", personal data only in response to: (1) the authenticated user of the client device 110 is determined to be "Jane Doe" (see operation 402); and (2) the authenticated user "Jane Doe" corresponds to the user (e.g., "Jane Doe") associated with the document barcode 312. Conversely, in the present example, if the processor determined that the authenticated user of the client device 110 is "John Smith", the processor may refrain from obtaining personal data for the document, at least, because the document 300 is a user-specific document for "Jane Doe".

In some examples, the personal data associated with one or more document markers may include dynamic data varying over time. As an illustrating example, the personal data may include mutual fund market values that may fluctuate based on trends of major stock exchanges. In some examples, the processor may generate display data to configure the client device 110 to display an augmented output based on current personal data obtained from the account record. In another example, the personal data may be banking account data having dynamically changing value over time, and the current personal data may include a current market value of an account associated with the banking account data at a current time.

Based at least on obtained personal data associated with one or more document markers, augmented reality output may include textual data, graphical data, or other visualizations that may provide further granular or supplemental details associated with data types of the document 300. In some examples, augmented reality output may also include updated or current data associated with data types of the document 300 (e.g., updated banking product value, or the like). The fulfillment server 120 may generate the display data for configuring the client device 110 to display augmented reality output based, at least in part, on the prior obtained personal data.

At operation 408, the processor transmits, to the client device 110, display data based on the personal data. The display data may configure the client device 110 to display an augmented reality output based on: (1) the previously obtained personal data; and (2) at least one further image of the document 300. In some examples, the at least one further image of the document 300 may be successive subsequent images of a live-view document image accessed via the client device 110. Illustrative examples of augmented reality output based on the personal data is shown with reference to FIG. 5.

Figure 5:
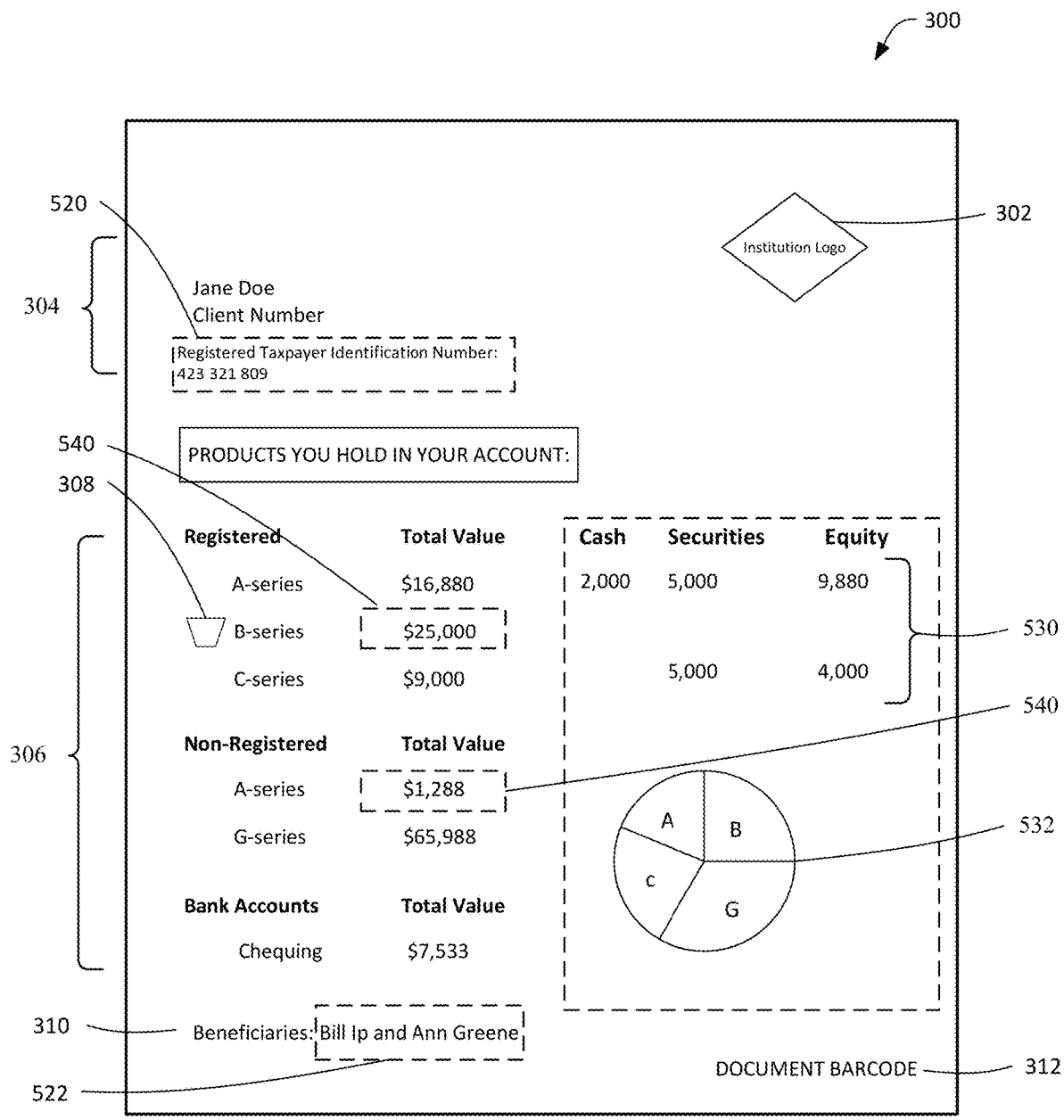
FIG. 5 illustrates the document of FIG. 3 having computer-generated augmented reality output integrated thereon, in accordance with an example of the present application.

Reference is made to FIG. 5, which illustrates the document 300 of FIG. 3 having computer-generated augmented reality output integrated thereon, in accordance with an example of the present application. For ease of exposition, in FIG. 5, augmented reality output features are highlighted within dotted line borders. It may be understood that when viewed through a display of the client device 110, the augmented reality output features may appear seamlessly integrated with one or more images of the document 300.

In one example, personal data including a registered taxpayer identification number 520 may be associated with the combination of document markers including: (1) the keyword expression "Jane Doe"; and (2) the document barcode 312. Thus, when the authenticated user (e.g., Jane Doe) views an augmented reality output of the document 300 through a display of the client device 110, the registered taxpayer identification number 520 may be provided on a live-view display. In the present example, the keyword expression "Jane Doe" may have been identified as a document marker and may be associated with a data type for a taxpayer identification number. Accordingly, in some example operations described herein, the fulfillment server 120 may have obtained, from the data record associated with the authenticated user "Jane Doe", the taxpayer identification number 520 for inclusion as augmented reality output.

In another example, personal data including the names Bill Ip and Ann Greene 522 may be associated with the text string "Beneficiaries" (e.g., a document marker). When the user views an augmented reality output of the document 300 using the display of the client device 110, the names of the beneficiaries may be visible.

Similarly, when the user views an augmented reality output of the document, the supplemental breakdown of mutual fund products 530 (e.g., dollar value of cash, securities, or equity associated with respective mutual funds) may be visible via the client device 110. The additional breakdown of mutual fund products 530 may be associated with the product logo 308.

In another example, products such as investments or banking accounts may have fluctuating value over time (e.g., stock exchange movement or day-to-day credits/debits associated with bank accounts). As described above, the fulfillment server 120 may generate augmented reality output associated with current personal data based on updated market values 540 for display as augmented reality output. In the present example, the updated market values 540 may be overlaid on legacy data. When the document 300 is viewed using the display of the client device 110, the legacy data may appear to be obscured or overwritten by augmented reality output representing the updated market values 540. For instance, a legacy data value (e.g., $23,111) associated with a "Registered B-series" product illustrated in FIG. 3 may be obscured or overwritten with an updated market value 540 (e.g., $25,000) in FIG. 5. Or a legacy data value (e.g., $433) associated with a "Non-Registered A-series" product illustrated in FIG. 3 may be obscured or overwritten with an updated market value 540 (e.g., $1,288) in FIG. 5.

In some examples, the respective document markers may be associated with instructions associated with location placement of the augmented reality output relative to legacy data. In FIG. 5, the text string "B-series" (e.g., a document marker) may be associated with relative location data to identify that augmented reality output associated with an aggregate "Total Value", that is associated with the authenticated user for the B-series product, shall be displayed/rendered in a region to the right side of the text string "B-series". Other methods of determining placement of augmented reality output may be contemplated.

In some further examples, the augmented reality output may include one or more graphs or charts associated with the personal data from the account record. For instance, the augmented reality output may include a pie chart 532 visually illustrating asset allocation information for the authenticated user. In some examples, the authenticated user may instruct, via a user interface, the client device 110 to capture a screen shot of the augmented reality output in combination with the visual representation of the document for the user's records. It may be appreciated that the one or more document markers, augmented reality output, or the document 300 illustrated in FIG. 3 and FIG. 5 are examples. Other document markers, augmented reality output, or documents may be contemplated.

As described, the client device 110 may be configured to provide augmented reality output for a live-view display of the document 300. For instance, the user may position the client device 110 to capture a live-view image of the document 300. In response to operations described herein, the client device 110 may receive the display data based on personal data to provide the augmented reality output as the live-view image of the document 300. The display data for providing the augmented reality output may be provided in near real-time such that the augmented reality output may be provided while the live-view image of the document 300 is active. The user may be restricted to viewing information associated with that user's personal data and not of other users.

In the examples described herein, the augmented reality output may be associated with respective users. When the client device 110 is authenticated based on credentials of a first user, the augmented reality output may be substantially different than the augmented reality output associated with a second user. The first user and the second user may be associated with different personal data and in different account records.

The image capture device 116 (e.g., of the client device 110) may capture a substantially whole view of the document 300. In some scenarios, the client device 110 may be positioned nearer to the document 300 such that the image capture device 116 may capture a partial view of the document 300. To illustrate, reference is made to FIG. 6, which illustrates an example partial view 600 of the document 300 of FIG. 3.

In FIG. 6, as compared to a substantially whole view of the document illustrated in FIG. 3, the client device 110 may be positioned nearer to the document 300 such that the client device 110 captures a view of a left-hand side of the document 300. That is, the client device 110 may capture an image including the summary list 306 of products associated with the user and to the exclusion of other portions of the document 300. Accordingly, based on obtained personal data from an account record associated with an authentication credential, the client device 110 may display augmented reality output associated with the product logo 308 or other keyword document markers. In FIG. 6, the augmented reality output includes the updated market values 540. That is, the client device 110 may display augmented reality output insofar as supplemental data corresponds to the relevant subset portion of the document as captured by the image capture device 116.

Figure 7:
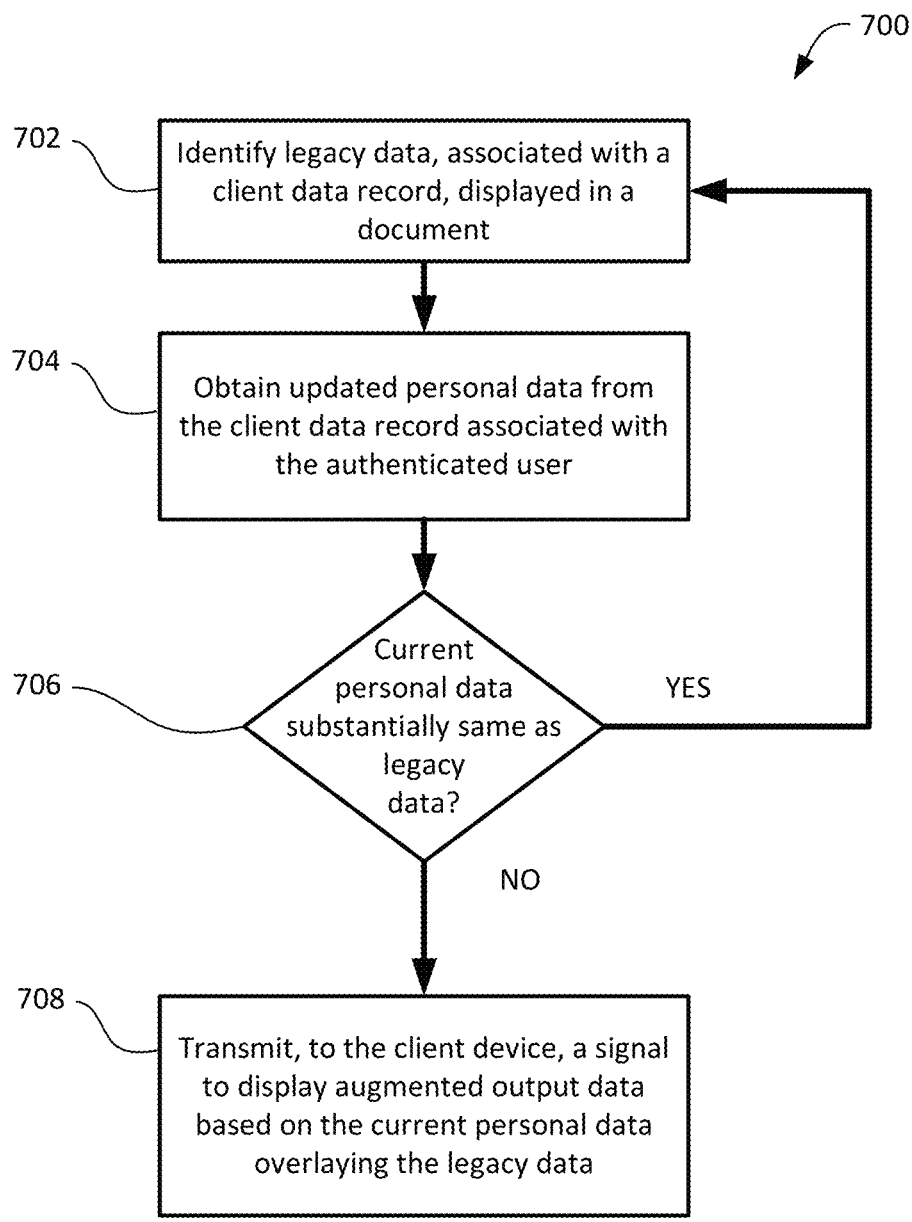
FIG. 7 illustrates, in flowchart form, a method of augmenting objects associated with personal data, in accordance with an example of the present application.

Reference is made to FIG. 7, which illustrates, in flowchart form, a method 700 of augmenting objects associated with personal data, in accordance with an example of the present application. The method 700 includes operations that may be carried out by one or more processors of the fulfillment server 120 (FIG. 1). For example, the method 700 may be implemented, at least in part, through processor executable instructions associated with the augmentation application 122 (FIG. 1). In some examples, one or more operations may be implemented via processor executable instructions in other applications or in an operating system stored and executed on the fulfillment server.

As described, personal data may include dynamic data varying over time. For example, investment products may have fluctuating value over time. It may be desirable to provide augmented reality output that is associated with current or updated data.

At operation 702, the processor may identify legacy data being displayed in a document 300. For example, the fulfillment server 120 may receive, from the client device 110, an image of the document 300 illustrated in FIG. 3 and may identify legacy data being displayed in the document 300. For example, the document 300 states that the "Registered B-series" holdings associated with the authenticated user have an aggregate total value of $23,111. However, the stated aggregate total value may be at a particular point in time (e.g., last day of the previous month). The data values illustrated in the document 300 may be outdated and the aggregate total value of $23,111 may be regarded as a legacy data value.

In the foregoing example, the processor may be configured to query the totality of data types associated with the document 300 to identify whether the respective data values may be outdated. Continuing with the above example, the processor may query the client data record associated with the authenticated user to determine whether the aggregate total value (e.g., for the "Registered B-series" holding) data of $23,111 has changed. That is, the processor may determine that the aggregate total value has changed if the current market value is different than $23,111. Other methods of determining whether data of the document 300 is outdated may be contemplated.

At operation 704, the processor may obtain updated or current personal data (e.g., data as of the time of data retrieval) from the client data record 124 associated with the authenticated user. In some scenarios, the processor may also generate the display data for displaying augmented reality output based on the current personal data.

At operation 706, the processor may determine whether the current personal data is substantially the same as the legacy data displayed in the document 300. In some examples, the processor may conduct image recognition operations to identify the legacy data displayed in the document 300 and may compare the identified legacy data with the current personal data. In the scenario that the legacy data displayed in the document 300 is substantially the same as the current personal data associated with the client data record 124, the processor may not generate augmented reality output to obscure or overwrite legacy data when viewing the document 300 using the client device 110.

In the scenario that the legacy data displayed in the document 300 is not substantially the same as the legacy data of the document 300, the processor, at operation 708, may transmit, to the client device 110, display data for displaying augmented output data based on the current personal data overlaying the legacy data to overwrite or obscure the legacy data when the document 300 is viewed using the client device 110. As illustrated in FIG. 5, the updated market values 540 may appear overlaid atop the legacy values of the document 300 when the document 300 is viewed via the client device 110.

As described, the fulfillment server 120 (FIG. 1) may generate display data based on personal data for configuring the client device 110 to display an augmented reality output based on the personal data and the at least one further image of the document. That is, the augmented reality output may be associated with numerous augmented reality output portions. Referring again to FIG. 5, the augmented reality output associated with the document 300 may include a registered taxpayer identification number 520, beneficiary names "Bill Ip and Ann Greene" 522, a granular breakdown of mutual fund products 530, pie charts 532 or other graphical illustrations based on personal data, updated market values 540, or the like.

Because an augmented reality output may be associated with a large quantity of augmented reality portions, it may be desirable to allow an authenticated user to identify a subset of augmented reality output portions for display. In some examples, the fulfillment server 120 may receive, from the client device 110, a user selection for identifying a subset of available augmented reality output. Further, the fulfillment server 120 may transmit further display data to display the selected subset of the augmented reality output at the client device 110. In an example scenario with reference to FIG. 5, an authenticated user may desire viewing augmented reality data associated with asset allocation mix information via a pie chart 532. In the present example scenario, the fulfillment server 120 may generate the display data for displaying augmented reality output of the pie chart 532 to the exclusion of other personal data. For instance, the authenticated user may be uninterested in displaying beneficiary names.

Figure 8:
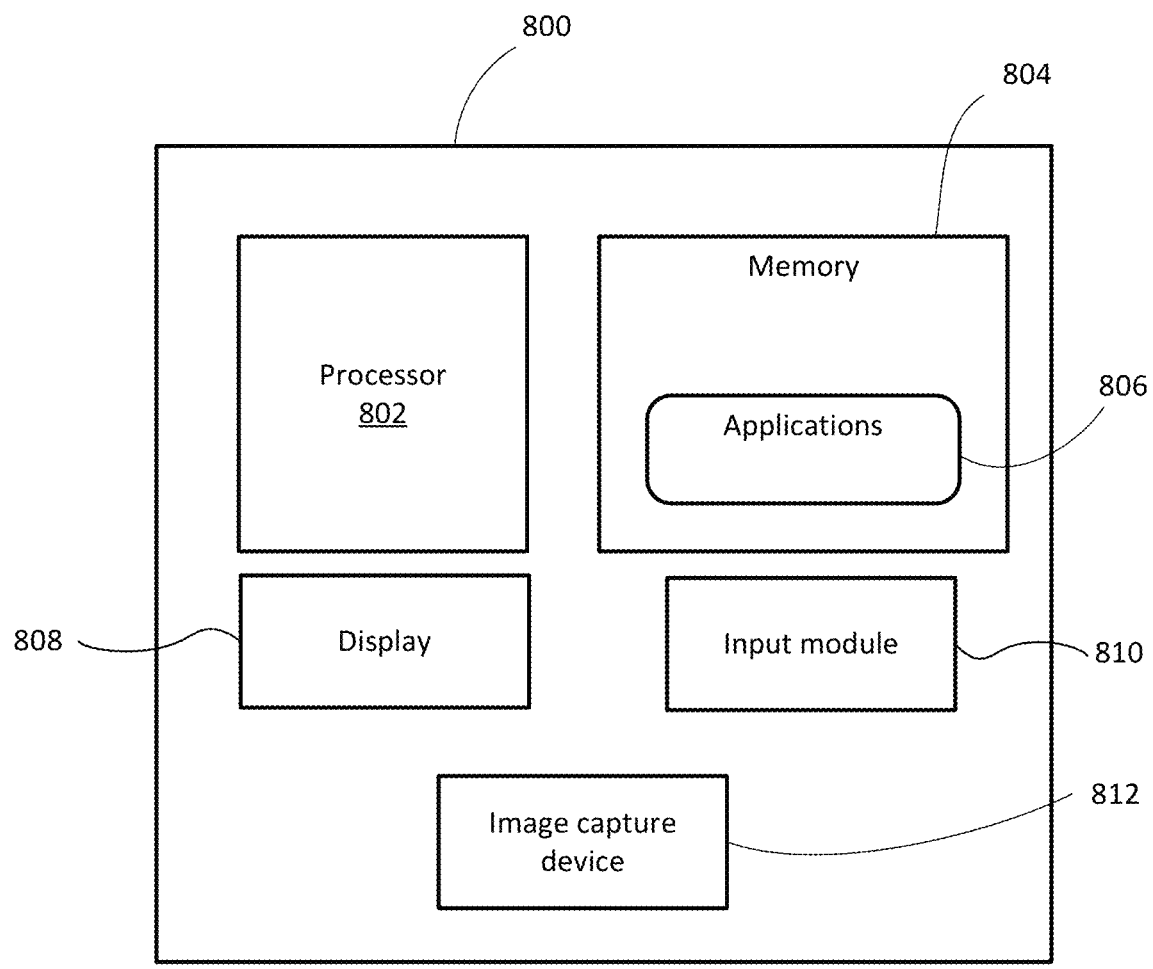
FIG. 8 illustrates, in simplified block diagram form, an electronic device, in accordance with an example of the present application.

Reference is made to FIG. 8, which illustrates, in simplified block diagram form, an electronic device 800, in accordance with an example of the present application. The electronic device 800 can be the client device 110 of FIG. 1. The electronic device 800 includes one or more processors 802, memory 804, and a communications module for providing network capabilities to communicate with other computing devices. The memory 804 may store processor executable software applications 806 that include an operating system to provide basic device operations. The software applications 806 may also include instructions implementing operations of the methods described herein.

The electronic device 800 includes a display interface and/or a display 808. The display 808 may be any suitable display such as a liquid crystal display (LCD), an e-ink/e-paper display, or the like. In some examples, the display 808 may be a touchscreen display. The electronic device 800 includes an input module 810 for receiving signals representing commands described in examples herein. In some examples, the input module 810 may be a keyboard device, a touch input device, or a microphone for receiving acoustic input from a user of the electronic device 800. The electronic device 800 may also include an image capture device 812. The image capture device 812 may correspond to the image capture device 116 of FIG. 1 for capturing images of objects or documents and/or providing a live view of the objects or documents on the display 808.

In some examples, the electronic device 800 may be a portable electronic device, such as a smartphone, a personal computer, a personal digital assistant, a portable navigation device, a mobile phone, a wearable computing device (e.g., smart watch, wearable activity monitor, or the like), or any other type of computing device that may be configured to store data and software instructions, and execute software instructions to perform example operations described herein.

Figure 9:
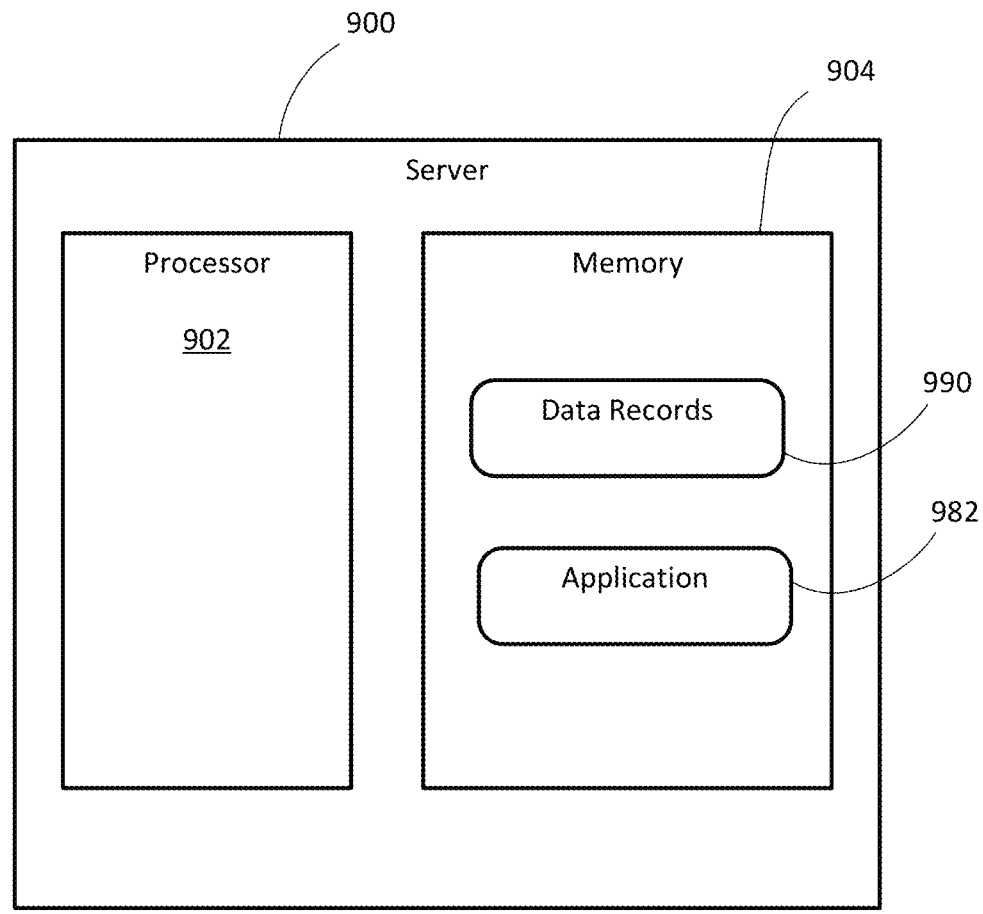
FIG. 9 illustrates, in simplified block diagram form, a server, in accordance with an example of the present application.

Reference is made to FIG. 9, which illustrates, in simplified block diagram form, a server 900, in accordance with an example of the present application. The server 900 may be the fulfillment server 120 of FIG. 1. The server 900 includes one or more processors 902, memory 904, and a communications module for providing network capabilities to communicate with other computing devices. The memory 904 may include data records 990. In the example of the fulfillment server 120, the data records 990 may include the client data records 124 and/or the resource records 126 of FIG. 1.

The memory 904 may also include applications 982 having instructions for performing operations described herein. In an example of the fulfillment server 120, the applications 982 may include the augmentation application 122 of FIG. 1.

Example embodiments of the present application are not limited to any particular operating system, system architecture, mobile device architecture, server architecture, or computer programming language.

It will be understood that the applications, modules, routines, processes, threads, or other software components implementing the described method/process may be realized using standard computer programming techniques and languages. The present application is not limited to particular processors, computer languages, computer programming conventions, data structures, or other such implementation details. Those skilled in the art will recognize that the described processes may be implemented as a part of computer-executable code stored in volatile or non-volatile memory, as part of an application-specific integrated chip (ASIC), etc.

Certain adaptations and modifications of the described embodiments can be made. Therefore, the above discussed embodiments are considered to be illustrative and not restrictive.

What is claimed is:

1. A computing system comprising:
   a communication module;
   a processor coupled to the communication module; and
   a memory coupled to the processor, the memory storing instructions that, when executed, configure the processor to:
   receive, from an authenticated client device, an image of a non-user specific account statement template document;
   obtain, from an account record, current personal data associated with the authenticated client device, the current personal data including dynamic data which varies over time;
   generate display data for configuring the authenticated client device to display an augmented reality output based on the current personal data, the augmented reality output converting the non-user specific account statement template document to a user specific account statement document that includes at least some of the current personal data; and
   configuring the authenticated client device to display the augmented reality output.

2. The computing system of claim 1, wherein the instructions, when executed, further configure the processor to:
   receive, from a second authenticated client device, an image of a non-user specific account statement template document;
   obtain, from a second account record, current personal data associated with the authenticated second client device, the current personal data including dynamic data which varies over time;
   generate display data for configuring the second authenticated client device to display an augmented reality output based on the current personal data obtained from the second account record, the augmented reality output converting the non-user specific account statement template document to a user specific account statement document that includes at least some of the current personal data; and
   configuring the second authenticated client device to display the augmented reality output.

3. The computing system of claim 1, wherein the current personal data includes banking account data having dynamically changing value over time.

4. The computing system of claim 1, wherein obtaining the current personal data associated with the authenticated client device is subsequent to authenticating the client device based on a credential.

5. The computing system of claim 1, wherein the augmented reality output includes a live-view display of the non-user specific account statement template document.

6. The computing system of claim 1, wherein the instructions, when executed, further configure the processor to identify a document marker using image recognition.

7. The computing system of claim 6, wherein the document marker includes at least one of a keyword, a barcode, or a graphical symbol.

8. The computing system of claim 1, wherein the augmented reality output includes at least one of graphs or charts associated with the current personal data.

9. The computing system of claim 1, wherein the instructions, when executed, further configure the processor to:
   receive, from the authenticated client device, a user selected subset of the augmented reality output; and
   transmit, to the authenticated client device, further display data for displaying the user selected subset of the augmented reality output at the authenticated client device.

10. A computer-implemented method of augmenting objects associated with personal data, the method comprising:
    receiving, from an authenticated client device, an image of a non-user specific account statement template document;
    obtaining, from an account record, current personal data associated with the authenticated client device, the current personal data including dynamic data which varies over time;
    generating display data for configuring the authenticated client device to display an augmented reality output based on the current personal data, the augmented reality output converting the non-user specific account statement template document to a user specific account statement document that includes at least some of the current personal data; and
    configuring the authenticated client device to display the augmented reality output.

11. The method of claim 10, further comprising:
    receiving, from a second authenticated client device, an image of a non-user specific account statement template document;
    obtaining, from a second account record, current personal data associated with the authenticated second client device, the current personal data including dynamic data which varies over time;
    generating display data for configuring the second authenticated client device to display an augmented reality output based on the current personal data obtained from the second account record, the augmented reality output converting the non-user specific account statement template document to a user specific account statement document that includes at least some of the current personal data; and
    configuring the second authenticated client device to display the augmented reality output.

12. The method of claim 10, wherein the current personal data includes banking account data having dynamically changing value over time.

13. The method of claim 10, wherein obtaining the current personal data associated with the authenticated client device is subsequent to authenticating the client device based on a credential.

14. The method of claim 10, wherein the augmented reality output includes a live-view display of the non-user specific account statement template document.

15. The method of claim 10, further comprising identifying a document marker using image recognition.

16. The method of claim 15, wherein the document marker includes at least one of a keyword, a barcode, or a graphical symbol.

17. The method of claim 10, wherein the augmented reality output includes at least one of graphs or charts associated with the current personal data.

18. The method of claim 10, further comprising:
receiving, from the authenticated client device, a user selected subset of the augmented reality output; and
transmitting, to the authenticated client device, further display data for displaying the user selected subset of the augmented reality output at the authenticated client device.

19. A non-transitory computer-readable storage medium storing instructions for augmenting objects associated with personal data, the instructions, when executed by a processor of a computing device, cause the computing device to:
receive, from an authenticated client device, an image of a non-user specific account statement template document;
obtain, from an account record, current personal data associated with the authenticated client device, the current personal data including dynamic data which varies over time;
generate display data for configuring the authenticated client device to display an augmented reality output based on the current personal data, the augmented reality output converting the non-user specific account statement template document to a user specific account statement document that includes at least some of the current personal data; and
configuring the authenticated client device to display the augmented reality output.

20. The non-transitory computer-readable storage medium of claim 19, wherein the current personal data includes banking account data having dynamically changing value over time.

* * * * *